United States Patent
Glass et al.

[15] 3,703,328
[45] Nov. 21, 1972

[54] DEVICES UTILIZING IMPROVED LINBO³ HOLOGRAPHIC MEDIUM

[72] Inventors: Alastair Malcolm Glass, Millington; George Earl Peterson, Short Hills, both of N.J.

[73] Assignee: Bell Telephone Laboratories, Incorporated, Murray Hill, N.J.

[22] Filed: July 21, 1971

[21] Appl. No.: 164,506

[52] U.S. Cl....................................350/3.5, 340/173
[51] Int. Cl............................................G02b 27/22
[58] Field of Search.................350/3.5, 147; 340/173

[56] References Cited

UNITED STATES PATENTS 3,544,189   12/1970   Chen et al. .................350/3.5

OTHER PUBLICATIONS

Ashkin et al., 9 Applied Physics Letters 72 (7/1966)
Chen et al., 13 Applied Physics Letters, 223, (10/1968)
Firester; 10 J. Applied Physics 4842 (11/1969)
Amodel, 18 Applied Physics Letters 22 (1/1971)
Amodel, 18 Applied Physics Letters 540, (6/1971)

Primary Examiner—David Schonberg
Assistant Examiner—Robert L. Sherman
Attorney—R. J. Guenther et al.

[57] ABSTRACT

Volume holographic devices utilize lithium niobate, $LiNbO_3$, containing added iron ions. The added ions provide for improved resolution and contrast. Utilization is made of the improved material in devices designed for multiple image recording and readout. In a preferred embodiment, selection, as among images, is determined by the angle of incidence of the interrogating beam.

9 Claims, 1 Drawing Figure

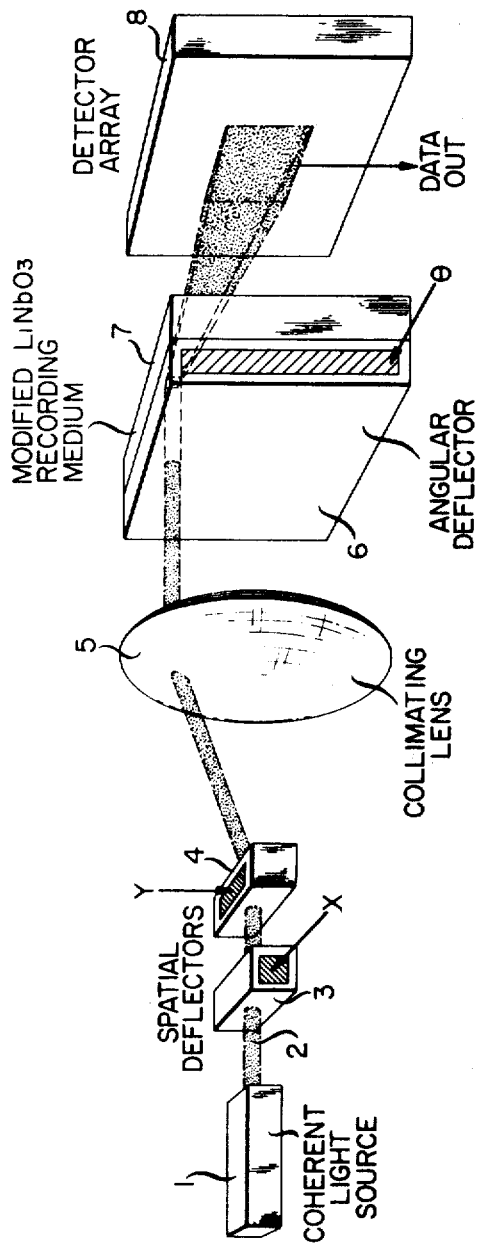

DEVICES UTILIZING IMPROVED LINBO'HOLOGRAPHIC MEDIUM

BACKGROUND OF THE INVENTION

1. Field of the Invention

The invention is concerned with volume holographic media and devices. Bit density is enhanced by multiple image recording.

2. Description of the Prior Art

Optical memory systems including both digital and analogous arrangements, the latter exemplified by holography described in texts on optics became practically realizable with the commercial availability of the laser about a decade ago. This type of recording depends upon the developed interference pattern of two or more beams of electromagnetic radiation, one of which is designated a reference beam while the other/s, sometimes containing intelligence, may be designated signal beam/s. Reconstruction of recorded interference patterns is accomplished by an interrogating beam ordinarily made incident on the recording medium at the Bragg angle.

Two-dimensional holographic arrangements depending on this principle have been in widespread experimental use for some years. A number of suitable media, many of which operate on a photographic principle, have been utilized.

The concept of volume holography is dependent on the inherent characteristic of spacial redundancy, i.e., the fact that repeating sets of interference fringes contain the same information. Multiple imaging takes advantage of the use of different angles of incidence of one or more of the interfering waves thereby resulting in sets of fringes which may be selectively accessed. Selective access is accomplished by utilization of an interrogating beam at such angle of incidence that the Bragg requirement is met. The fact that fringes of different order images may supplement or even result in occasional erasure is of no consequence in a medium sufficiently thick to provide for the necessary redundancy.

The concept of volume holography has been an extremely enticing one. Capability of such systems based on presently available optics suggests the possibility of random access memories containing from $10^{10}$ to $10^{12}$ bits of information in a reasonable volume (a cubic centimeter or less). In fact, at this time, there would appear to be no other proposed systems inherently capable of such capacity.

It is recognized that the failure of holography to reach commercial fruition arises from deficiencies in present recording media.

Search for an appropriate holographic medium has included investigation of a variety of materials. Traditional gelatins, photographic emulsions, are generally useful two-dimensional media although they are not generally easily erasable. Transparency is generally sufficiently limited to make the development of a reasonably thick medium unlikely.

Photochromic materials such as single crystalline KBr have been proposed for this use. The phenomena relies on a change of absorption and/or index of refraction on illumination. Induced change is erasable usually by thermal means. Limitations largely involve low diffraction efficiency and, in the case of organic photochromics, chemical instability.

Magnetic materials depend upon a form of Curie point writing. A magnetic field is imposed across a medium. Illumination results in local heating sufficient to reduce the coercivity of the medium and so enable the applied field to produce reversal in magnetization direction. Readout is accomplished, for example, by use of a detector sensitive to Faraday rotation of an accessing beam. Such systems are recommended by their inherently high resolution, good stability, and easy thermal erasure. The recording process, however, usually requires high peak power.

A system that has certain inherent advantages utilizes crystalline ferroelectrics. Their suggested use first arose from the observation of "optically-induced damage." Such material, when utilized in optical circuit elements, was found to develop scattering centers attributable to the development of local refractive index inhomogeneities. It has been recognized that at least one such material, $LiNbO_3$, is capable of high resolution. See U. S. Pat. No. 3,544,189. Erasure may be easily accomplished in bulk, by thermal means, or selectively, by optical means. High diffraction efficiency is to be expected although optimization has awaited identification of the mechanism responsible for the development of index inhomogeneities.

SUMMARY OF THE INVENTION $LiNbO_3$ as a memory medium for use, for example, as a digital deflector recording medium or as a volume holographic medium is improved by incorporation of small amounts of iron ions under conditions such that there is a reasonably even distribution of such ions in the divalent and trivalent states. Addition of iron is such as to bring the total content to a minimum level of 100 ppm in units of cation content (100 ppm is approximately the same as 0.01 mole percent $Fe_2O_3$). For usual holographic media thicknesses, a maximum content of $Fe^{2+}$ of about 500 ppm is prescribed. The total iron content may reach a maximum of about 1,000 ppm, for even distribution of divalent and trivalent ions or higher values where the trivalent form is prevalent. In more precise terms the limits may be expressed as 50, 250 and 500 ppm $Fe^{2+}$ and amounts of $Fe^{3+}$ which desirably at least equal but may exceed such amounts. Since $Fe^{3+}$ has little effect on transparency the excess may be appreciable, e.g., 100 percent or greater.

Introduction of iron content may be in initial ingredients during growth or subsequently. Other processing steps are generally conventional but are designed so as to enhance the $Fe^{2+}/Fe^{3+}$ ratio and to provide the appropriate distribution of ionic content, or at least so as to leave such ratio unimpaired. For example, ferroelectric poling required to produce single domain material is maintained for as short a period as possible to prevent ion clumping.

A device embodiment of the invention involves means for varying the angle of at least one of the write or read beams so as to provide for multiple imaging. One such preferred embodiment involves use of an acoustooptic element for accomplishing this end.

BRIEF DESCRIPTION OF THE DRAWING

The FIGURE is a schematic view in perspective depicting an illustrative system designed for volume holographic recording and interrogation.

DETAILED DESCRIPTION

1. The Drawing

The depicted system utilizes a coherent light source 1 yielding coherent beam 2, spacial deflectors 3 and 4, collimating lens 5, angular deflector 6, modified LiNbO$_3$ recording medium 7 and detector 8. As depicted, the system is described in terms of interrogation. For writing information, means shown are provided for interfering laser beam 2 or a portion thereof with one or more information-containing beams. The depicted system provides for a phase hologram formed in a thick medium (a medium of sufficient thickness to contain a repeating number of interference fringe sets so as to statistically compensate for destruction by members of other sets). Recording a hundred images within a volume defined by a common surface requires a thickness of approximately 0.25 millimeters under general operating conditions. This thickness is accordingly considered a preferred minimum for these purposes.

A phase hologram formed in the transparent holographic medium 7 may be considered a three-dimensional diffraction grating which diffracts a light beam in the same way that a crystal lattice diffracts a monochromic beam of x-rays. There are well-defined Bragg angles of incidence at which diffraction is maximized. Away from these angles there is no coherent diffraction. Several holograms may be superimposed on the same volume as the recording medium and any one may be selectively interrogated by appropriate choice of the angle of incidence.

Coherent light source 1 may be a laser or more involved apparatus involving ancillary elements (second harmonic generators, etc.) yielding radiation having a fundamental wavelength of less than about 0.65 micrometers. This wavelength minimum is prescribed since it corresponds with a minimum quantum energy for effectively producing the refractive index change upon which the recording mode depends. This is described in some greater detail in a subsequent section herein. In the interrogation mode, source 1 may be operated at a somewhat longer wavelength. Such operation is desirable in that it permits long exposure without danger of erasure but complicated operation in that it requires an adjustment in the angle of incidence from that utilized in the recording mode to satisfy the Bragg angle condition. Spacial deflectors 3 and 4, the first producing X deflection and the second producing Y deflection, may operate on any suitable principle, for example, acoustooptic, electrooptic, magnetooptic, etc. Means for producing such deflection are not shown and may include acoustic generators and terminators, electrode structures, means for applying magnetic or electric fields, energy sources, etc. For detailed description of appropriate apparata, see Vol. 46, Bell System Technical Journal, p. 957 (1967) and Vol. 6, Journal of Quantum Electronics p, 223 (1970).

The function of $x,y$ spacial deflectors 3 and 4 is to provide the first level of spacial addressing. These elements may be considered as dividing the recording medium 7 into a grid corresponding with individual recording regions. Collimating lens 5 serves to focus the beam and thereby produce a well-defined demarkation between adjacent regions. Element 6 is a large aperture angular deflector which selects the desired recording or interrogation angle. Element 6 may also operate on any deflection principle involving interaction of light with, for example, acoustic, magnetic, or electric energy. Since deflector 6 is in juxtaposition to LiNbO$_3$ element 7, the angle of incidence of the beam in the storage medium has little effect on position, i.e., essentially the entirety of the designated region within the grid defined by deflector elements 3 and 4 may be utilized. The depicted arrangement includes a detector array 8, as defined, to detect the information yielded during the interrogation of recording medium 7. Such an array may be composed, for example, of silicon photodiodes.

It has been shown that at least 100 superimposed holographic images can be recorded and subsequently read out by approximate angle selection without appreciable cross talk. Since present technology permits attainment of a grid of about $10^7$ regions on a feasible area (of the order of 1 square centimeter), a system such as that depicted in the FIGURE is, in principle, capable of providing $10^{11}$ information bits.

Systems such as those depicted are erasable either in bulk or selectively. Such erasure may be accomplished by uniform irradiation, again, utilizing a wavelength of 0.65 micrometers or less, or by nonuniform irradiation defining a negative image at such angle of incidence as to correspond with a selected positive image to be erased.

2. The Composition

The fundamental composition of materials herein, while designated by the nominal formula LiNbO$_3$, may and usually does vary somewhat from the indicated stoichiometry. It is well known that such variation may be desirable, for example, to expedite growth in which instance the congruent 0.486more nearly coinciding with the formula (Li$_2$O)$_{0.486}$(Nb$_2$O$_5$)$_{0.514}$ is indicated. In essence, the improvement resulting from the invention involves addition of iron ions to the composition. The mechanism responsible for the refractive index change is one of electron hopping, as discussed in section 4 herein. Specifically, the responsible mechanism involves liberation of an electron by a light-energized Fe$^{2+}$ ion. Electrons so liberated are captured by randomly saturated Fe$^{3+}$ ions. The significant index change corresponds with the change in concentration of Fe$^{3+}$ ions in selected regions.

It is seen, therefore, that the inventive teaching may take the form of a prescribed Fe$^{2+}$ content, of course, always assuming at least an equal number of Fe$^{3+}$ ions to act as capture centers. From the standpoint of the invention, it is prescribed that iron be added to the composition so as to result in at least 50 ppm of Fe$^{2+}$ (Fe$^{2+}$ cations relative to lithium plus niobium cations). It is, therefore, required that iron content also include at least 50 ppm of Fe$^{3+}$. The total minimum iron content to be adjusted by addition, in accordance with the invention, is, therefore, at least 100 ppm total iron, assuming half the total iron to be Fe$^{2+}$ or such total amount of iron inclusion as includes 50 ppm Fe$^{2+}$. This minimum content has been found necessary to result in a significant improvement in diffraction efficiency as compared with LiNbO93 crystals grown conventionally.

A maximum Fe$^{2+}$ content on the same basis of 500 ppm is prescribed with a view to the transparency necessary for media having a thickness of the order of 0.25 mm (a thickness considered minimal for volume storage of multiple images in apparatus such as that depicted in the FIGURE.

$Fe^{3+}$ has little effect on transparency within the normal transparency range of $LiNbO_3$ (0.35 micrometer— 7.0 micrometers). For the most effective utilization, it is again desired that there be at least 500 ppm of $Fe^{3+}$ corresponding with the maximum indicated $Fe^{2+}$ content. There is, however, little disadvantage in increasing the $Fe^{3+}$ content even to levels several multiples of this amount.

A preferred minimum of about 100 ppm $Fe^{2+}$ (and therefore also at least about 100 ppm $Fe^{3+}$) is based on the observation that such content results in a diffraction efficiency of the order of 25 percent in a 2 mm thick crystal representing a 100 times improvement over usual optical grade $LiNbO_3$.

3. Processing

Growth of $LiNbO_3$ for the inventive purposes is carried out in the usual manner. The technique usually employed for the best optical grade material is seeded growth by a Czochralski technique. Starting ingredients, usually forming a congruent composition, may be $Li_2CO_3$ and $Nb_2O_5$. The procedure is described in Vol. 48, Journal of American Ceramic Society, p. 112, (1965) and usually consists of grinding of initial ingredients by ball milling followed by a series of sintering and regrinding steps until complete reaction is obtained. After reaction the product is melted and the crystal is formed by pulling.

Iron addition may be made at any time during processing. For expediency, such addition is generally made to the initial ingredients. Such ingredients of a purity considered acceptable for optical devices generally contain of the order of 1 ppm total iron. It is generally desirable to continue to use ingredients considered acceptable for optical grade material since the inventive device, like other optical devices, is desirably kept reasonably free of uncontrolled scattering or absorption centers. Accordingly, the amount of iron to be added at this stage is of the order of 100 ppm based, again, on the total cation content of the starting ingredients. Such iron addition may be made in the form of $Fe_2O_3$, FeO or metallic Fe. Uniform dispersion is assured by following the usual grinding and sintering procedures.

Actual growth may be carried out utilizing standard furnace equipment and standard ancillary apparatus such as supports, crucibles, etc. Some materials incorporated in standard apparatus may contribute as much as an additional 10 ppm of iron. Such addition is of little consequence from the standpoint of the invention.

After growth, it is necessary to ferroelectrically pole the final crystalline material to eliminate domain walls. This is accomplished, again, in the usual manner by maintaining a current of the order of 5 milliamps per square centimeter of crystal area through the crystal ordinarily while cooling the crystal from near its melting point over an interval of about 50° C. This poling procedure is necessarily carried out over a temperature range which includes the Curie point; and this Curie point, depending on compositional variations encompassed within the formula $(Li_2O)_{0.44-0.5}(Nb_2O_5)_{0.56-0.5}$, may vary over the temperature range of from 1,050° to 1,180° C. To avoid clumping (i.e., inhomogeneous distribution) of iron ions, it is desirable to keep poling time to a minimum. In general, poling may be accomplished in a period of 5 minutes or less.

The stability of $Fe^{2+}$ relative to $Fe^{3+}$ increases with increasing temperature and the as-grown material has a thermodynamic distribution which provides for the maximum $Fe^{2+}/Fe^{3+}$ ratio. It has been found that annealing at temperatures substantially below the Curie temperature, results in some decrease in diffraction efficiency. Accordingly, it is deduced that the $Fe^{2+}/Fe^{3+}$ ratio is reduced to less than 50 percent by such treatment. This effect is particularly noticeable for annealing below about 700° C and so such annealing is generally to be avoided. If other desiderata require annealing below 700° C, the $Fe^{2+}/Fe^{3+}$ ratio may be increased to a more desirable level by subsequent high temperature annealing.

4. Mechanism

Explanation of refractive index change in lithium niobate is dependent on a valence change of iron ions during device operation. It is inherent in holographic recording that the electromagnetic radiation corresponding with interference fringing is of nonuniform intensity across the crystal. The effect is to preferentially excite the $Fe^{2+}$ ions located in the most intensely illuminated regions of the crystal. Such excited ions may then liberate electrons, so being converted to $Fe^{3+}$. Electrons so liberated are captured by other $Fe^{3+}$ ions generally in less intensely illuminated regions of the crystal, and such ions, in turn, are converted to $Fe^{2+}$. The overall effect is a changing distribution of $Fe^{2+}$ ions which results in the creation and redistribution of local refractive index inhomogeneities via the electronic effect.

5. Examples

The following examples recite different procedures utilized for growing designated compositions. In Examples 2 and 4, iron is added and processing is such as to assure a reasonable level of $Fe^{2+}$. Example 3 is added to show the effect of low temperature annealing. Example 1, included as a reference, sets forth the usual growth procedure. Each example includes measured diffraction efficiency. The diffraction efficiency value set forth in each instance is a "saturation value," i.e., such measurement is made subsequent to sufficient exposure to result in the maximum index change attainable under the given operating conditions. The test source used for the measurements produced an intensity of about 10 watts per square centimeter and had a wavelength of 5,145 angstroms. For comparison purposes, all sections utilized in the examples were 0.2 cm in the thickness direction. In each instance a calculated value of $Fe^{2+}$ ion content is set forth.

EXAMPLE 1

A crystalline section cut from a congruent composition produced from starting materials having a total iron content of about 1 ppm and utilizing standard grinding and sintering under conditions such that iron content was increased to about 10 ppm in the final crystal was utilized. Exposure of such crystal to a beam intensity of 10 watts per square centimeter at room temperature resulted in a diffraction efficiency of 0.2 percent in a period of 1 minute. The $Fe^{2+}$ concentration of the sample was of the order of 5 ppm.

EXAMPLE 2

A crystalline sample was prepared from the same starting ingredients of those of Example 1, with the addition of 0.05 mole percent $Fe_2O_3$. Such section incorporated in a device operating on the general principle of that of FIG. 1, resulted in a diffraction efficiency of 44 percent in less than 1 minute. The $Fe^{2+}$ concentration of this crystal was about 250 ppm.

EXAMPLE 3

The sample of Example 2 was annealed in air at 700° C for 75 hours at 600° C. Such section subjected to the same device environment as that of Examples 1 and 2 resulted in a diffraction efficiency of 1 percent in less than 1 minute. The $Fe^{2+}$ concentration of the sample was of the order of 20 ppm.

EXAMPLE 4

A crystalline sample was prepared from the same starting ingredients as those of Example 1 with the addition of 0.015 percent $Fe_2O_3$. The resulting crystal developed a diffraction efficiency of 5 percent in less than 1 minute. The $Fe^{2+}$ concentration of this sample was of the order of 75 ppm.

What is claimed is:

1. A volume hologram storage arrangement comprising a single crystalline body of material within the range designated by the formula $$(LiO_2)_{0.44-0.5}(Nb_2O_5)_{0.56-0.5},$$

said body having a thickness sufficient to permit storage of multiple images therein when irradiated on a given surface by an information-containing beam incident on the said surface at any of a number of angles of incidence corresponding with the number of multiple images together with means for directing at least a first beam of coherent electromagnetic energy at the said crystal, said means including provision for making the said beam incident on the said body at any of a number of prescribed angles of incidence, characterized in that the said material contains iron added in an amount sufficient to produce a total $Fe^{2+}$ ion content of at least 50 ppm based on total cationic content of the said material and at least an equal number of $Fe^{3+}$ ions.

2. Arrangement of claim 1 in which the $Fe^{2+}$ content is at least 100 ppm.

3. Storage arrangement of claim 1 in which the means for providing a prescribed angle of incidence consists essentially of an angular deflector element juxtapositioned to the said crystal.

4. Arrangement of claim 3 in which the said deflector depends for its operation upon an acoustooptic interaction with the said beam.

5. Arrangement of claim 1 including $x$ and $y$ deflector elements for selectively irradiating discrete areas of the said crystal.

6. Arrangement of claim 5 in which the said deflectors depend for their operation upon an acoustooptic interaction.

7. Arrangement of claim 5 in which the said deflectors depend for their operation on an electrooptic interaction.

8. Arrangement of claim 7 in which the said deflectors depend for their operation on a magnetooptic interaction.

9. Apparatus comprising a single crystalline body of material within the range designated by the formula $$(LiO_2)_{0.44-0.5}(Nb_2O_5)_{0.56-0.5}$$

provided with first means for illuminating selected portions of said medium so as to alter the refractive index of said portions and second means for detecting the said change in the refractive index, characterized in that the said material contains iron added in an amount sufficient to produce a total $Fe^{2+}$ ion content of at least 50 ppm based on total cationic content of the said material and at least an equal number of $Fe^{3+}$ ions.

* * * * *